Sept. 1, 1964 W. McK. MARTIN 3,146,691
HEATING DEVICE
Original Filed Oct. 12, 1959 5 Sheets-Sheet 1

INVENTOR.
WILLIAM McK. MARTIN
BY
ATTORNEY

INVENTOR.
WILLIAM McK. MARTIN

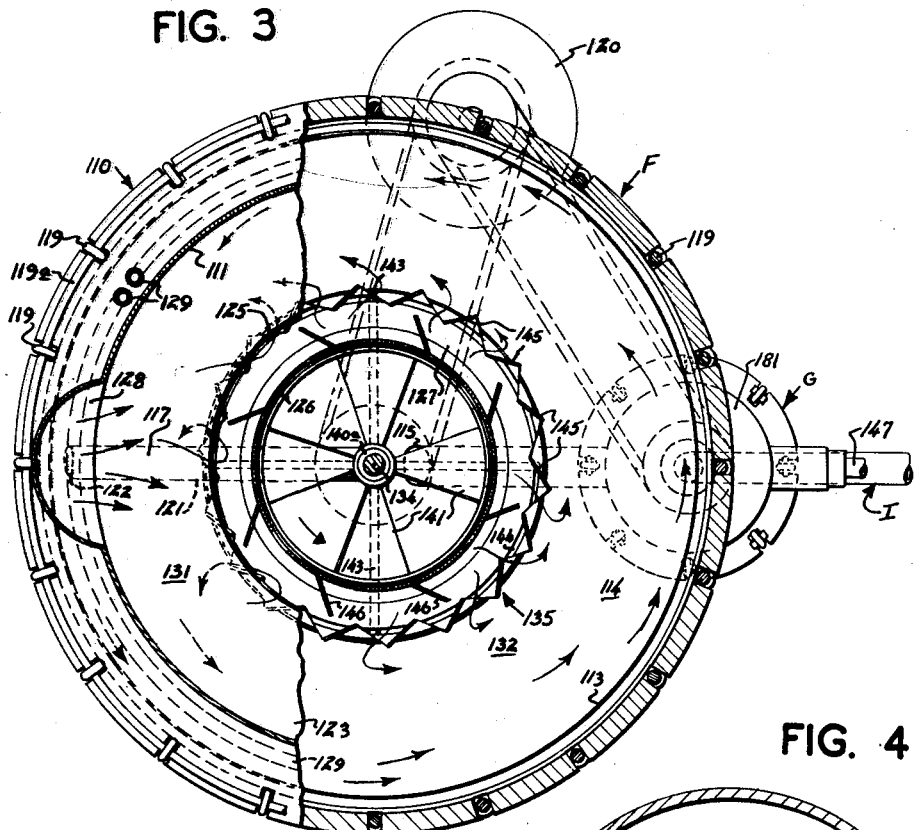
FIG. 3
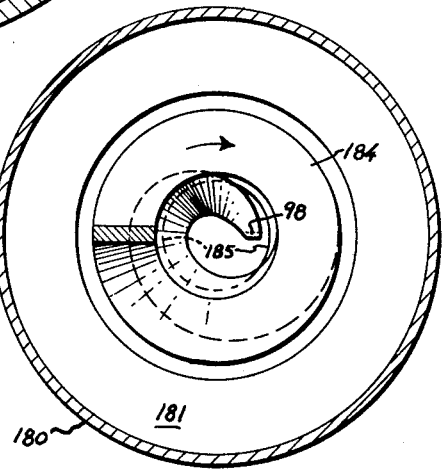
FIG. 4
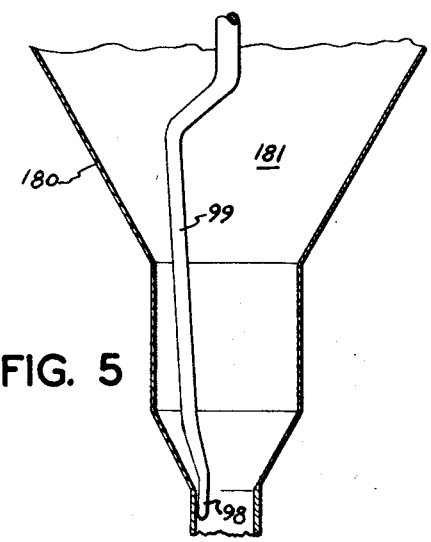
FIG. 5
INVENTOR.
WILLIAM McK. MARTIN
BY
ATTORNEY INVENTOR.
WILLIAM McK. MARTIN

ATTORNEY

United States Patent Office 3,146,691
Patented Sept. 1, 1964

3,146,691
HEATING DEVICE
William McK. Martin, 457 Virginia Ave.,
San Mateo, Calif.
Original application Oct. 12, 1959, Ser. No. 845,744, now Patent No. 3,041,185, dated June 26, 1962. Divided and this application Mar. 30, 1961, Ser. No. 108,696
17 Claims. (Cl. 99—330)

This invention relates to method and apparatus improvements for use in aseptic canning systems. It relates especially to the aseptic canning of foods containing suspended solids, such as vegetable soup, beef stew, and the like. Short-time, high-temperature sterilization is employed in a novel manner.

This application is a division of my application Serial Number 845,744, now Patent No. 3,041,185, granted June 26, 1962 filed October 12, 1959, which was a continuation-in-part of my application Serial Number 759,098, filed September 4, 1958, now abandoned, which was a continuation-in-part of my application Serial Number 546,306, filed November 14, 1955, now abandoned.

A very important object of the present invention is to prevent disintegration, attrition, or mushing of the solid components in the food product while assuring their complete sterilization.

Another important object of the invention is to provide for the continuous production of canned fluid or semifluid food products containing solid pieces and having better flavor, color, texture, and uniformity than can be produced by conventional canning methods. The invention can also be used to produce homogeneous liquid and semiliquid canned products of improved quality.

Although the apparatus and methods of this invention will be described in connection with an aseptic canning system, many features are useful elsewhere in other food and chemical processing systems; so the invention is not to be interpreted as confined too narrowly.

THE ASEPTIC CANNING PROCESS CONSIDERED GENERALLY

The aseptic canning process differs from conventional canning methods in that the product to be canned is sterilized before it is sealed in the containers, or even put into them, whereas in the conventional methods, the product is first put into the containers and sealed, and then the sealed containers are heated in a pressure cooker or retort to sterilize the product. In aseptic canning, the product is quickly heated to an elevated temperature in the range of 275–300° F., is maintained at that temperature for sufficient time to effect sterilization, and is then rapidly cooled to 90–110° F.; the cooled sterile product is filled into presterilized containers in a sterile atmosphere, and the containers are sealed with sterile covers while still in the sterile atmosphere.

The heat-treatment received by the product in the sterilization step of the aseptic canning method is a matter of seconds, as compared with minutes in the conventional canning methods. For example, the conventional in-can sterilization process for green split pea soup in 303 x 406 cans (16-oz. size) comprises heating the sealed can of soup for 55 minutes at a temperature of 250° F. In comparison, the aseptic canning method achieves sterilization of the same product before filling by holding it for only 8.8 seconds at 286° F. In the process of this invention, it takes only one or two seconds to heat the soup to 286° F., for a total heating time of about ten or eleven seconds to effect sterilization.

While the short-time, high-temperature sterilization process of this invention provides for continuous high-speed aseptic canning with more precise automatic control and consequent savings in labor and heat-energy, these savings and this speed are not its only advantages. Equally important is the fact that the finished canned product has better flavor, color, texture and vitamin content than the product resulting from lower temperature sterilization.

This outstanding improvement in quality is due to the fact that the lethal effect of heat upon bacterial spores increases at a very much higher exponential rate with increasing temperature than do the chemical changes that cause the degradation of flavor, color, texture and vitamin constituents of the product. In fact, the sterilizing effect or lethality, time being constant, increases tenfold while the chemical reactions responsible for degradation of food quality increase only twofold, with each increase in 18° F. in process temperature. Some idea of the importance of this interesting relationship can be grasped by remembering that $2^4$ is 16, while $10^4$ is 10,000.

QUANTITATIVE EVALUATION OF LETHALITY

The quantitative evaluation of lethality, or the sterilizing effect, of short-time, high-temperature processes for canned foods is expressed in the formula (given in the National Canners Association Laboratory Manual for the Canning Industry, 2nd Edition, Chapter 12, page 37):

$$F_0 = \frac{S}{60} 10^x$$

where $$X = \frac{T-250}{z}$$

$S$ = the time in seconds during which the product is held at a process temperature T,
$T$ = the temperature in ° F. of the product during the process time S, and
$z$ = the slope of the thermal death-time curve in ° F., which for most of the common low-acid food products has been found to be 18° F.

In the above formula, 250° F. is taken as a standard reference temperature, and the sterilization value $F_0$ is expressed as time in minutes at this temperature. The sterilization values ($F_0$) are thus expressed on a comparable basis, regardless of the actual process temperature.

To illustrate the practical significance of the quick, high-temperature sterilization process used in the present invention, let use see how temperature affects the "minimum botulinus cook," i.e. what is takes to kill the dangerous bacterium, *Clostridium botulinum*. For the destruction of its heat-resistant spores $F_0=4$. A 100 percent margin of safety would be given by using $F_0=8$. Now compare the times necessary for equivalent sterilization processes at various temperatures, shown in the following table:

*Relation of Temperature and Time in Equivalent Sterilization Processes of Clostrodium botulinum, at $F_0=8$*

| Process temperature T, °F. | Process time S, minutes |
|---|---|
| 214 | 800. |
| 232 | 80. |
| 250 | 8. |
| 268 | 0.8 (48 seconds). |
| 286 | 0.08 (4.8 seconds). |
| 304 | 0.008 (0.48 seconds). |

Thus, a few seconds in the higher temperature range are equivalent to many minutes at lower temperatures; and this short-time sterilization of foods at high temperatures does not degrade the food quality, as lower temperature sterilization does.

PROBLEMS IN QUICKLY HEATING FOODS TO BE CANNED ASPETICALLY

There are, however, many difficulties involved in quickly heating food products to temperatures of 275–300° F. Scorching and local overheating of the product at the heat-exchange surfaces in the heater are difficult to avoid—almost impossible when using most conventional heaters. Also, the solid components of the product tend to be disintegrated or mushed by their movement through the heater and other parts of conventional processing equipment.

Food products, being of organic composition, are very heat sensitive; they readily adhere to, and form crusts or films on, the hot surfaces of the types of heat-exchangers heretofore known. Local overheating or scorching of solid material that adheres to the heat-exchange surface not only imparts a cooked or burnt flavor and an objectable color to other parts of the product contacting it in movement through the heater; in addition, burnt-on or heat-congealed film on the heat-exchange surface markedly reduces the efficiency of heat-transfer.

If the product to be processed contains suspended solids of a frangible nature, the problems of heating and handling through the processing equipment are even more difficult.

Of the various types of heat exchangers commercially avaliable for use in the food industry, none has been found satisfactory for short-time, high-temperature processing of the solids-containing products mentioned above, as the following comments will illustrate:

(1) When tubular heat exchangers are used for heating heat-sensitive products to temperatures in the range of 250–300° F., high velocity flow must be maintained in the heating tube in order to reduce burn-on or filming of product on the hot surface of the tube. For example, in the quick, high-temperature sterilization of ready-to-serve (not condensed) green split pea soup, the soup is pumped continuously through a steam-jacketed ⅜″ O.D. (0.305″ I.D.) stainless steel tube at a velocity of 29.5 feet per second. The pump pressure required to maintain this velocity through the heating tube and other parts of the system is in the range of 2,600 to 2,800 p.s.i. Even then, burn-on occurs and reduces the efficiency of heat transfer to the extent that the heating tube must be cleaned with suitable detergents at approximately two-hour intervals during operation.

The amount or rate of burn-on or filming will, of course, vary according to the nature and composition of the product being heated. For example, in processing tomato soup with the same equipment and under the same tempertaure and velocity conditions, burn-on occurs so rapidly that the heating tube must be cleaned after about each 30 minutes operation. Thus tubular heaters have disadvantages even with homogeneous liquid food products.

More important, tubular heaters can *not* be used at all for high-temperature processing of foods containing suspended solid components. Obviously, it would not be possible to pump or otherwise convey solid components through small-diameter tubes, and even if it were possible to do so, the solid components would be completely disintegrated by attrition during high-velocity flow through the small-diameter heating tubes. Large-diameter tubes give insufficient heat-exchange surfaces, and the pumps necessary for turbulent flow of the large volumes involved and over the tremendous lengths that would be required, are unobtainable and if obtained, would pulverize the solids.

Tubular heaters also cannot be used for processing viscous products, such as condensed soups, because impracticably high pump pressures would be necessary to force such products through the heating tube at sufficiently high velocity to reduce burn-on to an acceptable level in commercial operations.

(2) Plate heaters are widely used in heating and cooling nonviscous liquids in the lower temperature range of 140–200° F. Plate heaters are used mostly in the dairy industry for heating and cooling milk and milk products of low viscosity, using hot water or saturated steam at subatmospheric pressures to avoid burn-on or scorching of the product as it flows at low velocity over the heat-exchange surfaces.

However, in the high-temperature sterilization required in aseptic canning, plate heaters are subject to the same basic objection as tubular heaters: burn-on can be avoided only by high velocities. Furthermore, plate heaters are too weak to withstand the pressures necessary to obtain high-velocity flow of the product, and the narrow clearances between plates preclude their use in processing foods that are to retain their solid components as solid pieces.

(3) Heat exchangers with rotary scrapers have been used for heating liquiform food products to temperatures in the range of 250–300° F., and cooling them to any desired temperature. A typical machine has a steam-jacketed heat-transfer cylinder about 6 inches in diameter and 48 inches long in which is mounted a rotating shaft carrying scraper blades, which not only agitate and stir the products in contact with the heat-exchange surface, but also scrape the surface to remove encrusted or burnt-on material. The rotating shaft and blades mechanically damage and cause attrition of solid components. The damage is particularly objectionable when the liquid phase of the food product is of low viscosity, for the solid components are then partially disintegrated or mushed and also tend to build up in between the blades and the heat-exchange surface. In any event, heat transfer is inefficient.

Moreover, the rotary scraper type of heat exchanger cannot be used at all for quick high-temperature processing in the range of 275–300° F. of particulate products of thick or heavy consistency, such as condensed vegetable soup, beef stew and similar products. This inability is due not only to the objectionable disintegration and attrition of the solid components, but also to the low efficiency of heat transfer and to the difficulties of moving products of this type through the heating and cooling cylinder.

(4) Steam-injection heaters embody the principle of injecting steam directly into the liquid being heated, high-pressure steam being dispensed from nozzles or orifices. Typical examples are:

(*a*) In simple nozzle-type steam-injection heaters, steam is discharged directly into the body of liquid either in an open vessel or into the liquid as it flows continuously through a pipe.

(*b*) In tangential steam-injection heaters, steam orifices are positioned around the outside wall of a circular heating chamber so that the steam is discharged tangentially into the liquid as it flows continuously through the chamber. Compare the Peebles Patent No. 2,452,260 and the Gressly Patent No. 2,682,827.

(*c*) In combination steam-injection and mechanical-agitation heaters, the liquid is agitated or whirled at high velocity while steam is being injected into the rapidly moving liquid. Compare the De Bethune Patent No. 2,077,227, and the Hawk Patent No. 2,492,635.

(*d*) Combination steam-injection and steam-chamber heaters inject or mix steam with the liquid and then separate the excess or uncondensed steam from the liquid in a closed chamber. Compare the Hawk Patent No. 2,801,087.

Numerous disadvantages attend these apparatus. Temperatures and pressures are difficult to control owing to "surging" in the steam-injection apparatus. Product incrustation or burn-on forms on the nozzles or at the orifices bathed by or immersed in the product; it also forms on any of the hot metal surfaces in contact with the product. It is impractical to recirculate and reuse the same steam over extended periods of time. All such heaters mix the steam with the liquid to be heated; this in itself violently agitates the liquid, and agitation is highly objectionable in heating liquids containing suspended solid food.

In steam-injection heaters, either the steam is dispersed in the liquid or the liquid is dispersed in the steam, or there is a combination of both types of dispersions. When steam is dispersed in the liquid, the steam bubbles that are surrounded momentarily by liquid condense quickly in the liquid, resulting in a violent collapse of the bubbles and consequent violent agitation. Suspended solids present in the liquid (as in particulate food products like vegetable soup) are damaged or partially disintegrated by the agitation effect of the dispersed steam. If, on the other hand, the liquid product is dispersed in and mixed with the steam, the solid components are damaged or partially disintegrated in the mechanical dispersion and mixing of the product with the steam.

All of the above methods of heat-processing foods have been investigated by actual experimentation and none of them has been found satisfactory for use in the quick high-temperature sterilization of food products containing frangible solid components.

SOME CHARACTERISTICS OF THE HEATER OF THIS INVENTION

The present invention avoids mechanical damage and disintegration of solid components of foods by gently flowing the liquid-solid food mixture in a quiescent state and in a relatively thin layer with only its surface in contact with superheated steam, which sweeps the surface at high velocity. The food being heated and the steam heating medium are thus maintained as two separate and distinct phases, without intermixing. The gently moving quiescent mixture is quickly heated, while violent agitation of the product and the consequent disintegration of solid components are avoided.

It is thus an object of the present invention to provide a method for efficiently heating a fluid product to any desired temperature without scorching thereof, and without product burn-on or incrustation on any heat-exchange surface.

A further object of the invention is to transfer heat to a continuously flowing, partly liquid food product from a heated gas passing rapidly over an exposed surface of the product. The resulting gas-liquid interface provides the heat exchange and eliminates the need of metal heat-exchange surfaces.

Another object of the invention is to provide heat exchange between a hot gaseous or vaporous heat-exchange medium in the turbulent state and a gently flowing, cooler, product.

Another object is to avoid inefficient insulating layers which would be present in case of laminar flow of either the liquid or gas.

Yet another object of my invention is to provide a method and apparatus for uniformly heating homogeneous liquids or liquids containing sizable solid components, with controlled dilution or concentration.

THE NECESSITY OF STERILIZING THE PRODUCT BEFORE PUTTING IT IN THE CAN

High-temperature sterilization cannot be done after the product has been put in the can because of the slow rate of heat transfer from the outside to the interior of the product and because of control difficulties. The volumes and cross-sectional areas in cans are so large that when a peripheral portion is heated to 300° F., the inside center remains below the sterilization temperature long after sterilization has been completed at the peripheral portion and after prolonged heating has already begun degradation of the peripheral portion.

With viscous products in which heat transfer is by conduction and not by convection, high processing temperatures can not be used after the product is in the can because of excessive scorching of the product in contact with the excessively hot can walls. Furthermore, even with nonviscous or low viscosity liquid products, as well as particulate-type products such as whole kernel corn in brine and peas in brine, in which the heat transfer is largely by convextion, high-temperature processes can not be used satisfactorily after the product is in the can, because of the difficulties of accurately controlling the short process times required in the high-temperature ranges. Another difficulty is that the head space or fill of the can affects the degree of agitation of the product in the can, and if the can is overfilled, the reduction in headspace is reflected in less effective heat transfer; consequently, there is danger of understerilization with a consequent hazard of spoilage of the finished canned product.

In this invention, the high-temperature sterilization step precedes the filling step. The product is spread out in a thin layer and quickly brought to the sterilization temperature. Subsequently, the sterile food is cooled and is filled and sealed in the cans at the relatively cool temperature of about 90–110° F. That means that the already-sterilized food has to be put into already-sterile cans and sealed by already-sterile covers. It also means that the sterility of the cans and food must be maintained and protected before, during, and after the filling operation.

Other objects and advantages of the invention will appear from the following description of a preferred embodiment, and of some modifications.

BROAD CONSIDERATION OF THE PRESENT INVENTION

The present invention embodies a combination of sequential operations including (1) precooking or blanching each of the solid food constituents with both the temperature and time of treatment automatically controlled, (2) metering each of the precooked or blanched solid constituents into the liquid phase of the product in the desired amounts and proportions, (3) mixing the solid and liquid components and feeding the mixture uniformly to a pumping stage, (4) pumping the mixture into and through a product heater, a temperature holding tube, and a cooling system, to a filler, while maintaining uniform distribution of the solid components in the mixture throughout these operations, (5) quickly heating the product mixture to temperatures in the range of 275–300° F. without local overheating or scorching of any parts of the product and without attrition or disintegration of the solid components, (6) conveying the heated product mixture through the holding tube, in which it is maintained at the elevated temperature for sufficient time to cause penetration of heat into and throughout the solid components, thereby effecting complete destruction of bacterial spores and other microorganisms contained therein, (7) cooling the product mixture to approximately room temperature or to some other temperature below the flash point of the product at atmospheric pressure, and, (8) filling the cooled sterile product mixture in metered or measured amounts into presterilized containers while maintaining the product mixture under pressure in all parts of the system between the pump and the filler and while maintaining the filler in sterile condition at all times during operation.

In the drawings:

FIG. 1 is an isometric and partly diagrammatic view of a portion of an aseptic canning apparatus embodying the principles of the invention. Some parts are broken away and shown in section, to disclose other parts. FIG. 1 shows the metering and mixing apparatus and the product-sterilizing heater.

FIG. 3 is a view in horizontal section, taken along the line 3—3 in FIG. 2.

FIG. 4 is an enlarged view in horizontal section taken along the line 4—4 in FIG. 2.

FIG. 5 is a view in elevation and in section of a portion of a modified form of antibridging device that may be used in the float chamber of FIG. 2. FIG. 5 is on an enlarged scale with respect to FIG. 2.

GENERAL OUTLINE OF THE ASEPTIC CANNING SYSTEM OF THE INVENTION (FIG. 1)

Figure 1:
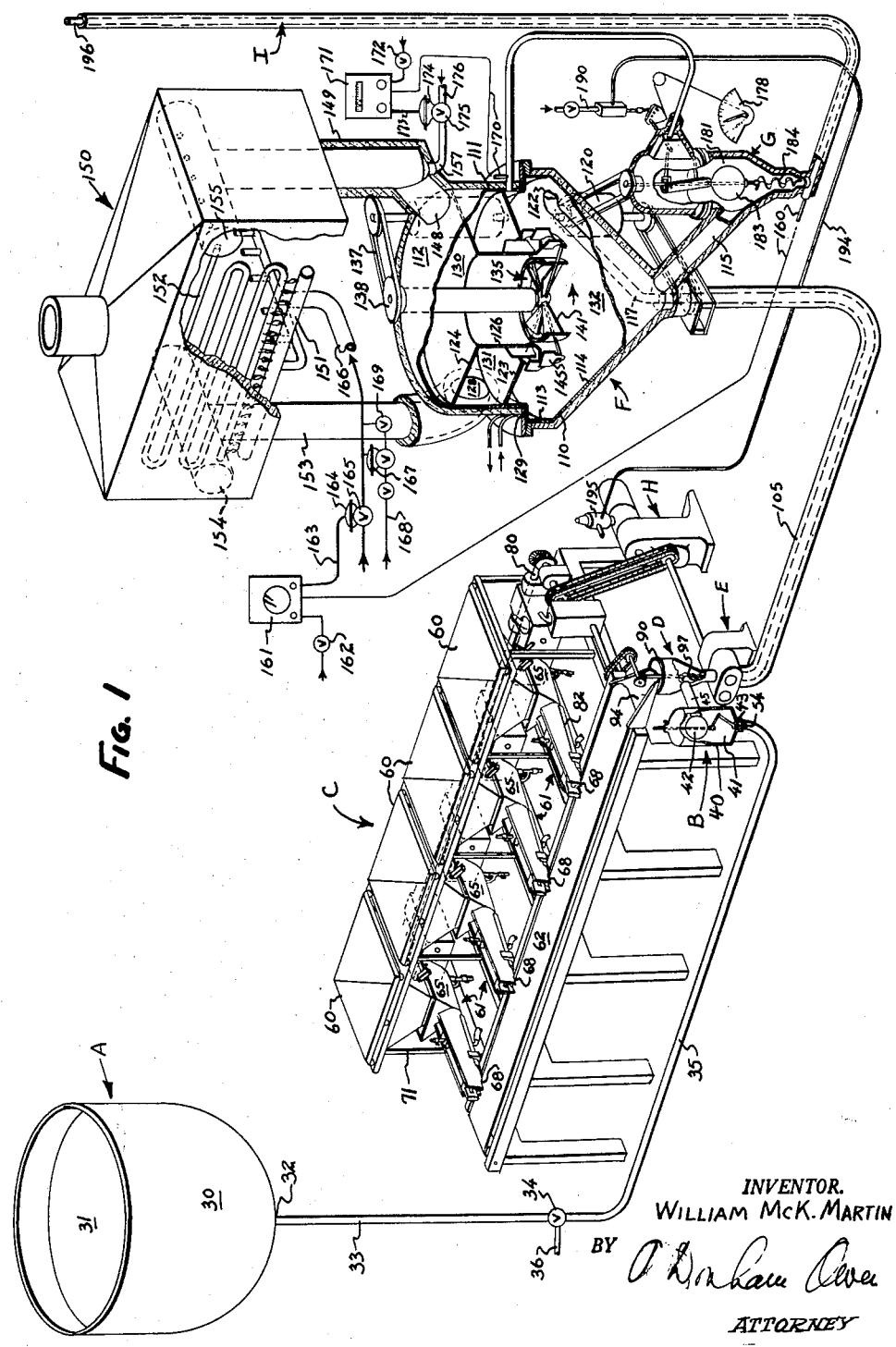

A liquid-supply unit A (FIG. 1) feeds the liquid phase of a product to be canned to a liquid-metering unit B. Meanwhile, a solids supply, metering, and blanching unit C feeds various measured amounts of particulate or solid components into a mixing device D, where the solids are added to and mixed with the liquid. From there, the mixture is forced by a pump E through the remainder of the system, going first to a product-heating unint F and then into a flow-control device G. The flow-control device G regulates a variable speed motor H, which in turn controls the speed of the pump E and the metering rate of the solids-feeding unit C.

THE LIQUID SUPPLY UNIT A (FIG. 1)

The liquid supply unit A may comprise a steam-jacketed kettle 30 which contains a liquid food component 31. The steam-jacketed kettle 30 may preheat or even precook the liquid 31 to any desired temperature, usually below 212° F. For that matter, for some uses the liquid 31 may be at the ambient temperature in an unjacketed supply tank. An outlet 32 at the lower end of the kettle 30 may lead into a vertical pipe 33, for gravity supply is desirable in the steps preceding the pump E. However, a pump may be used here in connection with a recirculating bypass, if desired. The vertical pipe 33 preferably leads through a three-way valve 34 to a pipe 35. The three-way valve 34 is used during the presterilization of the aseptic canning system, at which time the valve 34 closes off the pipe 33 from the pipe 35 and connects the pipe 35 to a water pipe 36. The purpose and operation of this feature will be explained later. At any rate, the pipe 35 leads into the liquid metering unit B.

THE LIQUID-METERING UNIT B (FIG. 1)

The liquid-metering unit B includes a generally cylindrical housing 40 providing a float chamber 41 in which is mounted a float 42. The chamber 41 has a bottom inlet 43 connected to the pipe 35 and also has a radial outlet part way up one side, lower than the desired level of the liquid 31 in the chamber 41. From the outlet a generally horizontal conduit 45 leads into the mixing device D. The liquid 31 will, of course, have substantially the same level in both the chamber 41 and the mixing device D. The float chamber 41 is of sufficient capacity to give an even flow of liquid through it, resulting from the gravity head of the kettle 30 (or pump pressure, if a pump is used before the unit B), and for the same reason has an adequate clearance from the float 42. In a typical apparatus the chamber 41 may be 10" in diameter and the float 7" in diameter.

The inlet 43 is provided with a butterfly valve 54 to throttle the flow. The butterfly valve 54 is, in principle and construction, hydrostatically balanced. Hence it is easily actuated by the float 42 at all liquid levels in the kettle 30 and at all liquid pressures in the pipe 35.

As the float 42 rises, it moves levers to close the butterfly valve 54 and thereby to reduce the flow of liquid 31 past the inlet 43. When the float 42 reaches a certain height, the butterfly valve 54 will close the inlet 43, and the supply of liquid 31 will be practically cut off. When the liquid level drops, the float 42 opens the valve 54. The float valve 42 thus meters the flow of the liquid 31 from the kettle 30 to the mixing device D and the pump E; it prevents the mixing device D from either overflowing or running empty and assures a level that enables good mixing of the liquid with the solids coming from the unit C.

SOLIDS SUPPLY, METERING AND BLANCHING UNIT C (FIG. 1)

As shown in the drawings, the metering and blanching unit C for solids includes a series of hoppers 60, one for each solid ingredient, a metering device 61 at the lower end of each hopper 60, and a single conveyor belt 62 on which all the metering devices 61 mete out their ingredients and which carries them to and dumps them into the mixing device D.

The solid constituents to be measured out may be such things as cubed or sliced vegetables (e.g., potatoes, celery, carrots, onions), whole small vegetables (e.g., beans, peas, and small onions), and meat (e.g., cubed beef or slices of ham); the cubes may be about ⅜" or ½" on a side, or whatever size one wishes them, the cutting being done in any desired manner. If desired, any of these ingredients may be precooked or sauteed. Once prepared, the solid constituents are placed into their respective hoppers 60.

The conveyer belt 62 is preferably driven at a fairly high speed, so that the solid food components from the various metering units 61 are discharged in a continuous stream into the mixing device D. If the belt 62 moved too slowly, the solid components would build up and be discharged unevenly into the device D. Hence, the belt 62 moves faster than the material can be piled up on it; how much faster is not critical.

As stated earlier, the food solids are blanched or preheated as they move through the metering unit 61. Saturated steam or hot water or hot solutions of suitable composition may be used to provide the blanching heat. The blanching time used depends upon the temperature of the blanching agent, the length of the blanching trough and the speed of the food through the blanching trough. Since the temperature is never higher than 212° F., blanching time is usually not too critical, unless it lasts so long that it overcooks the food.

THE MIXING DEVICE D (FIG. 1)

The mixing device D comprises a funnel or housing 90 having a side inlet connected to the conduit 45, an open upper end, and a bottom outlet, which preferably is also the inlet to the input pump E. Solid material falls from the belt 62 directly or down a chute 94 which ends below the open top of the funnel 90, and liquid passes through the conduit 45 into the inlet. The liquid flow rate and its level are determined by the float 42, while the solid components falling from the belt 62 are metered by the unit C.

The device D not only performs the function of mixing the solid components with the liquid 31 as the liquid flows continuously into the input pump E, but performs the very much more important function of preventing the solid components from accumulating and bridging over the funnel outlet and pump inlet. Actually, the mechanical operation of mixing the solid components with the liquid is simple compared with the anti-bridging function of this apparatus.

An axial vertical shaft is provided together with driving means, which may be, as shown, connected to the motor H, to rotate it at about 40–60 r.p.m. Too fast a speed tends to disintegrate the solids while too slow a speed provides neither adequate mixing nor adequate disbridging. On the shaft is mounted a preferably hollow screw 97 having a descending helical thread terminating in a vertically downwardly extending, radially offset tip.

THE INPUT PUMP E (FIG. 1)

The input pump E is a suitable type of positive-displacement pump driven by a variable-speed motor H. It should be capable of pumping liquid products at pressures up to about 80 to 100 pounds per square inch and capable of operation without chopping or mechanically disintegrating the relatively soft food solids. It is a valveless pump, for valves tend to crush, cut, or chop the product. Such pumps are made by Waukesha Foundry Company and by Creamery Package Company. Alternatively, a Robbins and Myers Moyno pump may be used.

The pump E feeds the mixture 104 into the pipe 105 and on through the system to the point where the filler dispenses the mixture 104 into the containers. There are no valves or other obstructions between the pump E and the filler, though there is the flow-control device G beyond the heater F.

THE PRODUCT STERILIZER-HEATER F (FIGS. 1–3)

The heater F includes an insulated housing 110 having a cylindrical upper portion 111 with a closed upper end 112; a central cylindrical portion 113, and a conical funnel-like lower portion 114. The housing 110 may conveniently be made in two flanged pieces held together by eye bolts 119 having a ring 119a fitting through the eyes to give even pressure. The lower portion 114 has an outlet tube 115 leading from near its lower end at one side thereof and also has a central axial bottom opening 116. The inlet pipe 105 leads into the opening 116. An inlet tube 117 has its lower end rotatably mounted in this bottom opening 116 with suitable sealing means 118 to prevent leakage of the liquid at that point.

A motor 120 is provided to rotate the inlet tube 117 at a desired speed, preferably around 40 to 60 r.p.m. The inlet tube 117 has a portion 121 extending at an angle up into the housing 110, generally parallel to the conical wall 114. At its upper end, the tube 117 has an outlet spout 122 that always faces the adjacent central cylindrical housing wall 113, closely adjacent the upper end of the lower portion 114. The tube 117 and spout 122 act to pour the product gently down the sloping wall 114 and to distribute it around the housing 110 in a thin film. The slow speed of rotation of the spout 122 does not project the product by centrifugal force against the walls. The gently flowing product is heated by surface contact only with a swirling mass of superheated steam.

The housing upper portion 111 is provided with a pair of annular partitions 123 and 124. The lower partition 123 is preferably conical and extends inwardly and downwardly to an inner periphery 125. The upper partition 124 also slopes down and is approximately parallel to the lower partition but is provided with a depending cylindrical portion 126 spaced inwardly from the inner periphery 125 of the lower partition 123. The lower end of the depending cylindrical portion 126 is tapered outwardly and terminates in a generally radially outwardly extending flange 127. The periphery of the flange 127 is approximately in vertical alignment with and approximately at the same radius as the inner periphery 125 of the lower partition 123. Between the upper and lower partitions 123 and 124 the upper housing wall 111 is provided with an inlet opening 128 for superheated steam. A cooling channel 129 is provided for circulating water to keep the adjacent housing wall cool so that spattered soup or other food product being heated will not be burned onto the housing surface. Additional channels like the channel 129 may be provided wherever desired, especially where the housing is shaped differently than the housing 110. For example, there may be one around the wall 113.

Thus the housing 110 is divided by the partitions 123 and 124 into three main chambers, an upper chamber 130, an intermediate chamber 131 where the stream is introduced, and a lower chamber 132 into which the food product 104 is introduced by the revolving spout 122.

From the spout 122 the product 104 flows gently onto the vertical wall 113 and down the sloping wall 114, the rotation of the inlet tube 117 serving to spread the product 104 out into a film-like mass 133. The slope of the wall 114 depends upon the viscosity of the material 104 and upon the contact time desired to heat it. For more heating contact, the slope should, of course, be less, and for less viscous material the slope should also be less. A slope of about 45° is satisfactory for many soups, but different slopes may be used, depending on the desired operating conditions including the size of the device as well as the type of product.

The upper end wall 112 of the housing supports a drive shaft 134, which extends down along the axis of the housing and at its lower end supports a fan 135. The drive shaft 134 projects out of the housing 110 and is provided with suitable driving means, such as a high-speed motor 136 acting through a belt 137 and a sheave 138 on the shaft 134. A suitable thrust bearing 139 is provided to support the shaft 134, and preferably the shaft 134 is protected and sealed by a housing 140, which encloses a cooling tube for water and a lubricating system for the shaft 134.

The fan 135 is a compound structure rotating with the drive shaft 134. It includes a hub 140a from which extend a plurality of inner blades 141 which are tilted so that, when they rotate, they move steam from below them to above them. At the outer periphery of the inner blades 141 is a cylindrical shell 142 which, of course, also rotates with the shaft 134. The upper end of the shell 142 fits fairly closely within the cylindrical depending portion 126 of the upper partition 124, with a suitable working clearance. A series of radially outwardly extending rods 143 is supported by the hub 140a and supports a circular rim 144. This rim 144 extends vertically to a level up just below the lower partition 123 and just radially beyond the outer periphery of the flange 127. The upper part of the rim 144 is cut and bent to provide a series of impeller blades 145.

Thus it will be seen that the intermediate chamber 131 serves as a steam entrance and distributing chamber with the steam coming in through the inlet 128 and going out along the lower edge 125. The impeller blades 145 rotating at high speed (e.g., at about 1800 r.p.m. in a housing 110 about 3' in diameter) pull the steam out from the chamber 131 and impel it in a whirling motion inside the lower chamber 132 and out toward the walls 113 and 114 down which the food product 104 is flowing gently. To prevent the impeller blades 145 from driving some of the steam back up into the chamber 131 and causing counter currents, a series of stationary vertical baffles 146 is provided, tilted in the opposite direction to which the blades 145 are tilted.

The hot steam (e.g., at 800–1200° F.) whirled out by the blades 145 (see FIG. 3) comes against the descending food product 104 that is flowing gently down the walls 113 and 114 of the lower housing, this gentle flow constantly exposing new surfaces of the product 104. The whirling steam does not enter the food product but does heat its surface. Then the cooled steam (e.g., at 350–450° F.) is sucked up by the fan's inner blades 141 and pulled through the interior of the cylindrical partition portion 126 into the upper chamber 130.

The whirling blades 145 provide for very efficient heat transfer by the high-velocity flow of the superheated steam and also throw back into the film 133 any droplets or particles of the food product, to prevent them from splashing against any metal surfaces where they might be charred. In this invention the mixture 104 touches only walls that are cooler than the mixture, i.e., the walls are insulated from the steam by the mixture itself.

A tube 147 leads from the chamber 132 to the control device G for maintaining pressure equalization, as will be explained later.

The upper chamber 130 is provided with a suitable steam exhaust outlet 148 from which a duct 149 conducts most of the steam to a gas-fired superheater 150 (FIG. 1) for recirculation. The superheater 150 is provided with a gas burner 151 and heat-exchanger tubes 152. A conduit 153 leads from an outlet manifold 154 of the superheater 150 to the inlet 128 of the product heater F. The return steam enters the tubes 152 from an inlet manifold 155. A steam bleed or discharge orifice 156 provides for the discharge of a constant small amount of steam in order to remove air or other undesirable gases from the system, while a steam inlet 157 admits a controlled amount of make-up steam.

Thus, superheated steam is continuously recirculated through the product heater F from the gas-fired superheater 150 by the fan blades 145 and 141. The superheated steam from the superheater 150 is impelled tangentially into the chamber 132 by the revolving impeller blades 145. The superheated steam thus whirled circularly in the chamber 132 sweeps the surface of the product mixture flowing gently down the walls 113 and 114 and quickly heats the continuously flowing product to the desired process temperature. After sweeping the surface of the product and imparting part of its heat to the product, the steam is recirculated by the fan blades 141 through the chamber 130 and the duct 149 to the manifold 155, and thence again through the superheater 150. The steam thus reheated is returned through the duct 153 to the annular chamber 131 from which it is again impelled tangentially into the product heating chamber 132.

REMARKS ON THE OPERATION OF THE PRODUCT HEATER F

A very important feature of the product heater F is that the product is heated solely by superheated steam at an interface between the steam and the food product 104. Both the product and the steam are moving, but the steam is not injected into the product. There is no mixture of the steam with the product. The contact is *solely with the surface* of the product, and that fact distinguishes it from the prior-art attempts to use steam heating, for in them the material was always heated at least partly by mixture.

The superheated steam impinging upon the gently flowing liquid product strikes the product with sufficient force to cause an interchange between the portion of the product that is on the surface and the underlying product, so that most or all portions of the liquid are presented to and contacted by the steam for uniform heat transfer throughout the entire liquid mass, all without intermixture of steam and product and without violent agitation of the product. Also, since the liquid is in a relatively thin layer, and since the steam is impelled generally uniformly in the chamber, a large liquid-gas interface is presented for optimum heat exchange.

Note that the heat is applied to the flowing liquid product directly from the superheated steam through a liquid-gas interface, without employing a solid heat-exchange surface. There is no burn-on, for that can result only when a static portion of a liquid product is overheated at a solid heat-exchange surface and adheres to it. In the heat exchanger of the present invention, the product itself insulates the walls 113 and 114 of the annular chamber 132 so that they cannot be raised to a sufficient temperature to cause burn-on or congealing of solids on the underlying metal surface. Only at the supper edges of the liquid does steam reach a metal wall 158 contacting the liquid, and here the cooling channel 129 prevents overheating of the metal wall.

The amount of heat imparted to the steam from the heating unit 150 may be made sufficient to heat the liquid entirely by convection rather than by any latent heat of condensation, at least when considering the net effect. For although some of the superheated steam will condense in the cooler portions of the liquid, an equivalent amount of steam is vaporized from the liquid.

My method of heat transfer may be better understood by first considering for a moment what would happen if the liquid were heated by saturated steam at 212° F. Although there still would be no mixture of the steam with the liquid in my process, some of the steam would condense and become part of the liquid, increasing its total volume and diluting it. All the heat transferred by such condensation would be due to the latent heat of condensation. Now, when the steam is heated to any point above 212° F., some of the heat transfer is due to the specific heat content of the steam being imparted to the liquid, the remainder of the heat transfer still being by condensation.

By making the steam hot enough and circulating it sufficiently rapidly, all the sensible heat will be transferred by convection, i.e., the transfer of heat will be by moving masses as distinguished from the transfer of heat through stationary masses, which is termed conduction. In the prior art, heat was usually transferred through the metal walls of a heat exchanger by conduction, whereas in the present invention heat is transferred by the physical movement of steam masses against liquid masses. This use of convection also distinguishes the present process from processes in which steam is mixed with the liquid and condensed into the liquid to transfer heat by the latent heat of condensation. In this invention, heat transfer can be entirely by latent heat of condensation or entirely by convection, depending on the amount of heat imparted to the steam in the superheater 150, on the volume and velocity of the superheated steam impinged onto the surface of the liquid product 104, and on the rate of flow of the liquid product.

If the heat imparted to the steam is increased beyond the equilibrium point, the amount of steam vaporized from the liquid will exceed that condensed in the liquid. If condensation is desired, this state will prevail. If equilibrium is desired, it is obtainable. At the equilibrium point the amount of heat imparted to the steam will be just sufficient to keep condensation and vaporization in balance. Operation is usually done with the steam at about 900° to 1200° F. when it leaves the superheater 150. Usually the blower fan 135 is kept at a steady rate of about 1750 to 1800 r.p.m. or even 3600 r.p.m., but it can be speeded up to increase the rate of heat transfer by convection or slowed down to give the opposite result.

The reason for whirling the superheated steam in the product heating chamber 132 is three-fold: (1) to prevent intermixing of the steam and the product, and thus to maintain the steam and the product as two distinct and separate phases in the heating operation, (2) to prevent the product from spattering onto the hot metal surfaces of the heating chamber 132, on which a spattered product would char and then fall into the product being processed and degrade it, and (3) to prevent entrainment of droplets or particles of the food product in the steam recirculated through the superheater 150.

The prevention of intermixture has been discussed. As to spattering, even the smallest microscopic droplets of product must be prevented from coming into contact with the hot metal surfaces. The whirling superheated steam picks up any droplets of product that even momentarily leave the surface and throws them back into the gently flowing product stream by centrifugal force.

Of equal importance is the prevention of entrainment of minute droplets or particles of product in the departing steam, where it would burn in the gas-fired superheater and impart a bad taste and smell to the product when the steam is recirculated. For that reason the return flow of steam from the chamber 132 to the gas-fired superheater 150 is from the *center* of the chamber 132, which is in effect the vortex of the whirling mass of steam. It follows that any microscopic particles of product will be separated from the whirling mass of steam by centrifugal force and not accompany the steam up from the vortex.

The results of extensive tests involving the continuous processing of pea slurry for 8-hour periods with the superheated steam maintained at a temperature in the range of 800–1000° F., showed no burn-on—not even a trace—on the fan surfaces, on the walls of the housing 110, on the ducts 148 and 153, or in the superheater tubes 152.

Another very important feature of the present invention is the means of avoiding burn-on and accumulation of incrusted charred product at the boundary of the liquid product and the hot metal surfaces 158. Since the product and the steam are maintained as separate and distinct phases, there is necessarily a boundary at which the product meets the hot bare metal surface 158. The surface 158, being bathed with steam, tends to attain approximately the temperature of the steam, whereas the metal surfaces 113 and 114 beneath the product will be at a temperature lower than that of the product 104. The product striking the boundary therefore tends to burn onto the hot metal surface and rapidly accumulate in the form of an incrusted mass which will be charred by hot steam.

The centrifugal effect of the superheated steam keeps the boundary of the product on the surface 158 close to the vertical wall 113. To prevent burn-on, incrustation and charring of the product on the metal surface 158 a stream of cooling water is circulated through the small annular cooling channel 129. The cooling channel 129 serves as a barrier to the conductance of heat from the superheated steam through the metal 158 to the boundary. By dissipating heat from this narrow margin of metal between the boundary of the product and the superheated steam, burn-on and incrustation of the product is entirely prevented. The cooled margin of the metal surface 159 will be wet with steam condensate at all times, and in consequence the troublesome boundary meets a wet surface instead of a hot dry metal surface.

The distributor tube 117 rotates at a relatively slow speed, preferably about 60 r.p.m. For a normal-diameter (e.g., two to four feet) housing 110, it should not revolve faster than about 80 r.p.m. because higher speeds of rotation have been found to damage and disintegrate tender frangible solid components in the product. Neither should speeds slower than about 30 r.p.m. be used, for to do so would result in discontinuous flow of product down the walls 113 and 114 of the chamber 132. That is, slow revolution of the distributor spout 122 would cause the product 104 to flow down the metal surfaces 113 and 114 in waves between which the surfaces 113 and 114 would drain substantially dry, and consequently the metal surfaces would be heated by direct contact of the superheated steam between cycles of the product distributor. The product distributor 122 should revolve at sufficient speed to keep the metal surfaces 113 and 114 wetted and covered with sufficient product 104 to prevent the underlying metal from being heated directly by the steam. In this way, the metal surfaces 113 and 114 are always kept at a lower temperature than the product 104 flowing in contact with them, and there is no burn-on or congealing of the product on the metal surfaces.

That the metal surfaces 113 and 114 are always at a lower temperature than that of the product 104 flowing over them has been demonstrated by actual tests in which three thermocouples were silver-soldered to the outside surface of the housing walls: one at the mid-point on the vertical wall 113, one at the mid-point of the sloping wall 114, and one at the bottom of the sloping wall 114 near the outlet 115. With the product distributor 122 revolving at 77 r.p.m., in a chamber 130 fourteen inches in maximum diameter, a split-pea slurry at a temperature of 186–192° F. was flowed continuously through the distributor spout 122 at a rate of 5 gallons per minute. With the superheated steam in the chamber 132 at 620° F. under a pressure of 62–70 p.s.i.g., the temperature of the metal surfaces beneath the flowing slurry, as recorded by the thermocouples, was 210–218° F. for the mid-point of the metal surface 113, 267–270° F. for the mid-point of the metal surface 114, and 284–290° F. for the metal surface at the bottom of the chamber. The slurry itself attained a final temperature in the range of 290–294° F. at the outlet 115.

TEMPERATURE AND PRESSURE REGULATION OF THE HEATER F (FIGS. 1 AND 2)

The quantity of heat imparted to the steam as it flows through the superheater 150 may be controlled by the temperature of the heated product, as by a temperature sensing element 160 located between the control device G and the temperature-maintaining device I. The temperature sensed by the element 160 is preferably transmitted to a recording temperature controller 161 of any suitable type.

The controller 161 may control the volume of gas-air mixture flowing to the gas burner 151 by means of a compressed air signal. Compressed air, with its pressure regulated to a constant value by a regulator valve 162, is supplied to the controller 161, and there its pressure is varied in accordance with the temperature sensed by the sensing element 160. The air then passes by a tube 163 to the diaphragm chamber 164 of a diaphragm-actuated butterfly valve 165. Air supplied under pressure, as by a blower (not shown), passes through the valve 165 into a mixing chamber 166, and its pressure acts on a second diaphragm-actuated valve 167 controlling the admission of fuel gas. The valve 167 assures that the quantity of gas admitted from a gas supply line 168 to the mixer 166 will always be in constant proportion to the quantity of air admitted to the mixer 166. A proportioning valve 169 is used to adjust this proportion.

The quantity of the gas-air mixture supplied to the burner 151 is thus controlled to give a constant temperature of the product at the sensing element 160.

Pressure may be controlled similarly. A pressure tube 170 may transmit the pressure inside the chamber 132 to an indicating pressure controller 171. Air under constant pressure determined by a regulator valve 172 enters the controller 171 where its pressure is varied in accordance with changes in the pressure in the tube 170. This signal air then passes through a tube 173 to the diaphragm chamber 174 of a diaphragm-actuated valve 175. The valve 175 admits pressure steam from a suitable source through a conduit 176 and the steam inlet 157 into the conduit 148 leading to the superheater inlet manifold 155.

As noted before, some steam (along with air, etc.) is constantly being bled from the system through the orifice 156; so the pressure in the chamber 132 will drop unless further steam is supplied through the inlet 157. The pressure controller 171 assures that the proper amount of steam will be added to maintain the pressure at exactly the right amount.

The amount of heat imparted to the product 104 flowing continuously through the heater F is determined by a combination of conditions, the most important of which are:

(1) The temperature of the superheated steam in contact with the surface of the product 104.

(2) The surface area of the product 104 in contact with the superheated steam.

(3) The rate of flow of the superheated steam whirled in contact with the surface of the product 104.

(4) The rate of flow of the product 104 through the product heater F.

(5) The depth of the film or layer 133 of the product 104 exposed to the superheated steam while flowing down the walls 113 and 114.

(6) The pressure of the superheated steam in the heater chamber 132.

In the operation of the heater F, unless the pressure of the superheated steam is equal to or in excess of the vapor pressure corresponding to the mean temperature of the product 104 as recorded by the temperature sensing element 160, the product will flash in the control device G and in parts of the temperature-maintaining device I situated above the control device G. The pressure in the heater F is therefore set and maintained by the pressure controller 171 at a predetermined value equal to or in excess of the vapor pressure of the product in the devices G and I.

For example, when the product is to be heated to a temperature of 290° F. as recorded by the sensing element 160 and automatically regulated at this temperature by the temperature controller 161, the pressure controller 171 is set to maintain a pressure of about 50 p.s.i.g. in the heater F and in the control device G. The vapor pressure of the product at a temperature of 290° F. is approximately 43 p.s.i.g. and about 7 p.s.i.g. excess pressure above that value has been found sufficient to prevent the product from flashing. A slight decrease in the temperature of the product 104 flowing past the temperature sensing element 160 causes an increase in heat at the gas burner 151 and a corresponding increase in the temperature of the superheated steam, which will thus bring the temperature of the product 104 up to the desired level.

As the pressure in the heating chamber 132 is decreased and approaches the vapor pressure of the product 104 at the process temperature, the amount of steam condensing in the product 104 decreases. If, for example, the temperature controller 161 is set to maintain the temperature of the product flowing past the sensing element 160 at 290° F. and if the pressure regulator 171 is set to maintain the pressure at 43 p.s.i.g., the air signal transmitted from the temperature controller 161 to the valve 165 will increase the air-gas supply to the burner 151 until the amount of steam condensing in the product 104 is exactly equal to the amount of steam vaporized from the product 104 and discharged continuously through the bleed orifice 156. At this equilibrium point the amount of steam admitted through the make-up steam inlet 157 by the pressure controller 171 will be exactly equal to the amount discharged through the bleed orifice 156.

If the pressure controller 171 should be set for a pressure below that corresponding to the vapor pressure of the product 104, the temperature of which is still maintained at 290° F., no steam would be admitted to the inlet 157 by the pressure controller 171, and the bleed of steam through the orifice 156 would reduce the pressure in the chamber 132, with a resultant flashing of the product 104. The flashing would cool the product; so the sensing element 160 would call for more heat from the superheater 150 until equilibrium is again reached. The temperature control system thus would automatically operate to supply not only the amount of heat required to heat the product 104 to the process temperature (e.g. 290° F.) but to supply also the amount of heat needed to vaporize from the product the amount of steam discharged through the bleed orifice 156. The product 104 would thus be condensed in this type of operation.

THE CONTROL DEVICE G (FIGS. 1, 2, 4, AND 5)

From the heater F, the food flows through heat-insulated equipment until it reaches the cooling tubes J. The insulation 177 is not in all instances shown in the drawings, for the sake of simplicity. The conduit 115 leads from the heating chamber 132 to the control device G, which has a housing 180 providing a float chamber 181. Depending from the top of the float chamber 181 is a shaft 182, driven by a suitable motor such as the motor 120 and on it is slidably mounted a float 183. At the lower end of the shaft 182 is a hollow screw 184 like the screw 97 in the mixing device D in construction and operating in exactly the same manner and for the same purpose, that is, for assuring the transmission of the mixture of materials and with a tip 98 that prevents bridging of the outlet 185 and crushing, mangling, or injuring the solid particles.

The float 183 is mounted slidably on the shaft 182 but has no other relation to it except that the shaft 182 serves as a guide maintaining the float 183 in proper diametrical alignment. A lever 186 attached to the float 183 operates a needle valve plunger 187 through a link 188 and a crank 189.

The needle valve 187 serves to throttle a constant stream of air under pressure (e.g., 20 p.s.i.g.) from a pneumatic tube 190, and serves as a control for the variable-speed motor H which drives the pump E. As the liquid level in the float chamber 181 rises, a bleed passage 191 that leads to a bleed outlet 192 is opened wider, thereby reducing the pressure of the air in a chamber 193 ahead of the outlet 192. This reduction in pressure effects a reduction in pressure in a tube 194, which, in turn, lowers the pressure in a pneumatic amplifier 195 (see FIG. 1), such as a Varitrol, which then acts to slow down the speed of the motor H for the pump E and the metering-blanching unit C. Then, the float 42 acts on the butterfly valve 54 to control the liquid level also, so that the liquid is also metered to give the correct proportion of liquid to solids. Thus the different parts of the system act on each other. In this connection, it should be pointed out, the cause of liquid rising in the chamber 181 and raising the float 183 is either that the pump E is feeding material too fast, or that the filler is dispensing material slower than its normal constant rate. Normally, the level of the liquid in the float chamber 181 is constant.

A calibrated liquid level indicator 178 may also be operated by the float 183 and helps in setting the proper level in the chamber 181. The level of the liquid in the float chamber 181 should always be high enough to prevent escape of steam into the temperature-maintaining device I and cooling device. It also should not be below the point where the tube 115 enters the chamber 181, so that steam from the chamber 132 cannot circulate through the chamber 181 and pressure-leveling tube 147, disrupting the steam circulation system and causing burn-on on and near the float 183. The level should not rise so high as to back heated product up into the housing 110.

The pressure-equalizing tube 147 maintains the pressure in the chamber 181 at the same level as in the chamber 132, so that the level of the float 183 is not affected by pressure differences. The tube 147 is not used to circulate steam; it merely equalizes pressure. The steam in the chamber 181 is saturated and at substantially the same temperature as the product 104 in the chamber 181. This arrangement has been found to be effective in keeping the product from burning onto the float 183 and the housing 180.

THE TEMPERATURE-MAINTAINING DEVICE I (FIG. 1)

The fluid passes from the outlet 185 into the temperature-maintaining device I by which it is held at the desired temperature for a time sufficient to complete sterilization, which may be from a few seconds up to about a minute. The larger the solid particles, the longer the time necessary to assure complete penetration of the particles by the heat at the holding temperature. For liquids like homogeneous pea soup 8 to 10 seconds at 286° F. is sufficient. For vegetable soup containing ⅜" cubed vegetables, a holding time of 38 seconds at 290° F. has been found sufficient for complete sterilization.

The device I may comprise an insulated tube 196 of diameter great enough to prevent damage to solid pieces in the moving product 104 and long enough to give the desired holding time while the product is continuously moved through the tube 196 by the pressure imparted in the heating chamber 132 at a velocity sufficient to maintain the proportions of the mixture without damage to the solid particles. Here, sterilization is finished.

AN ALTERNATIVE FORM OF PRODUCT HEATER 400 (FIGS. 6 AND 7)

Figure 6:
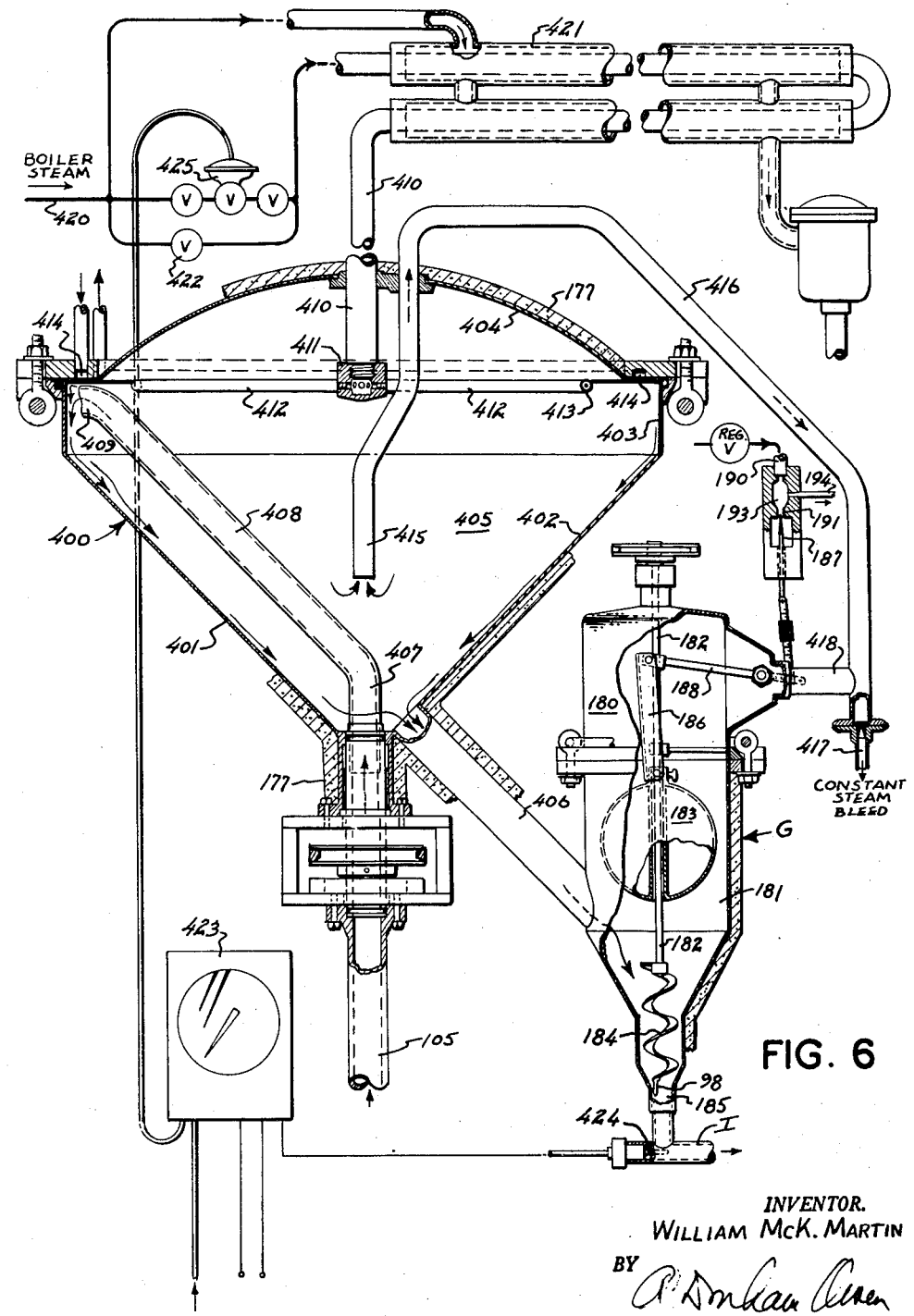
FIG. 6 is a view generally similar to FIG. 2 of a modified form of product heater-sterilizer.
Figure 7:
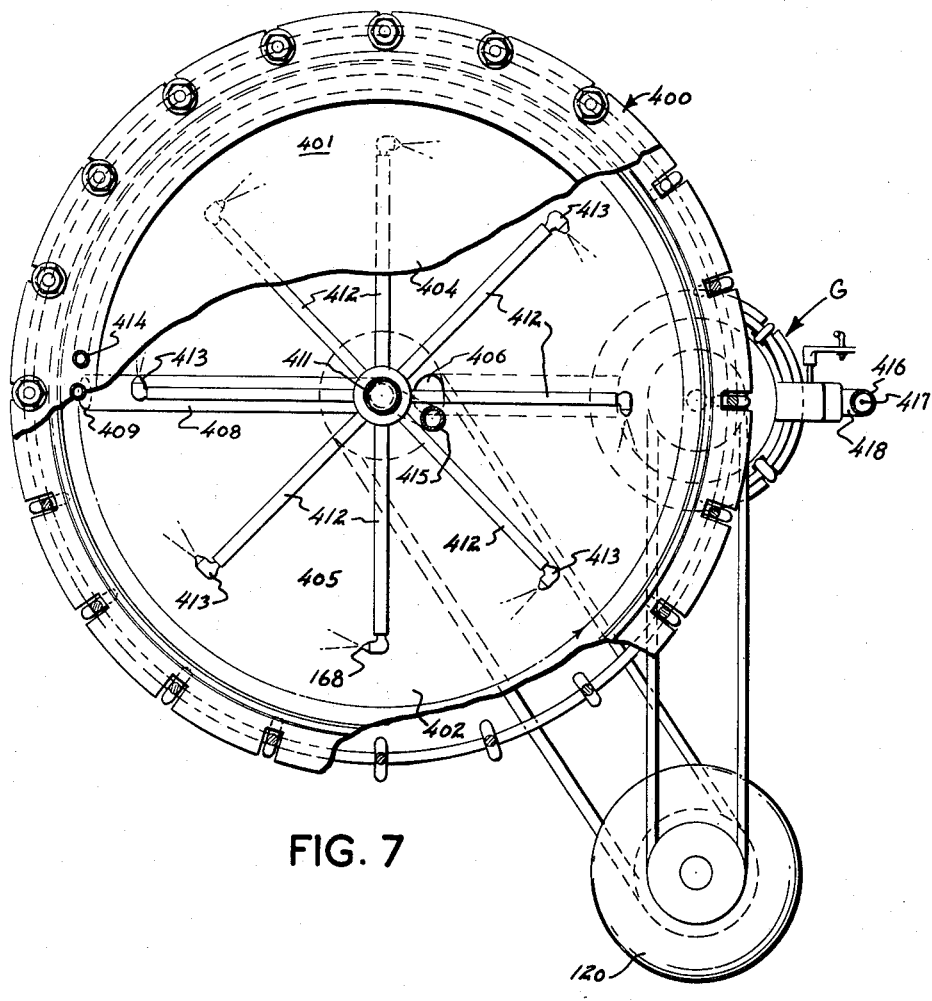
FIG. 7 is a top plan view of the heater of FIG. 6, with portions cut away and shown in section.

To illustrate how the product heater F may be modified, one alternative heater 400 is shown in FIGS. 6 and 7. A housing 401 has a funnel-like lower portion 402, a short cylindrical upper wall 403, and a top closure member 404 defining a heating chamber 405. A product outlet 406 may be the same as the outlet 115, and a rotatable inlet conduit 407 is like the conduit 117, with an upper inclined portion 408 and a spout 409.

The steam however is heated differently, is introduced differently, is not recirculated, and heats the product principally by latent heat of condensation. A steam inlet conduit 410 leads into a central manifold 411, from which a series of tubes 412 extend out radially. A nozzle 413 at the outer end of each tube 412 directs the steam perpendicularly to the radius and on the plane of the tubes 412, and thereby imparts a whirling motion to the steam. A cooling channel 414 for cold water keeps the boundary cool, as discussed above.

A steam outlet 415 bleeds a small constant amount of the steam out from the center of the chamber 405, sending it by a conduit 416 through a constant steam bleed orifice 417. A pressure equalizing tube 418 connects the conduit 416 to the control device G.

Boiler steam (usually at a temperature of about 350° to 360° F., depending on boiler pressure) comes in through a pipe 420, part of it being diverted to a heating jacket 421 at full boiler pressure and part of it flowing at low pressure through a manually-set valve 422. A temperature controller 423 (like the controller 161) has a temperature-sensing element 424 in the outlet from the control device G and regulates a valve 425 to regulate the steam pressure fed through the jacketed inlet conduit 410. Thus, part of the steam at high boiler pressure is used in the jacket 421 to superheat the remainder of the steam, supplied at regulated lower pressure to the inlet conduit 410.

Figure 2:
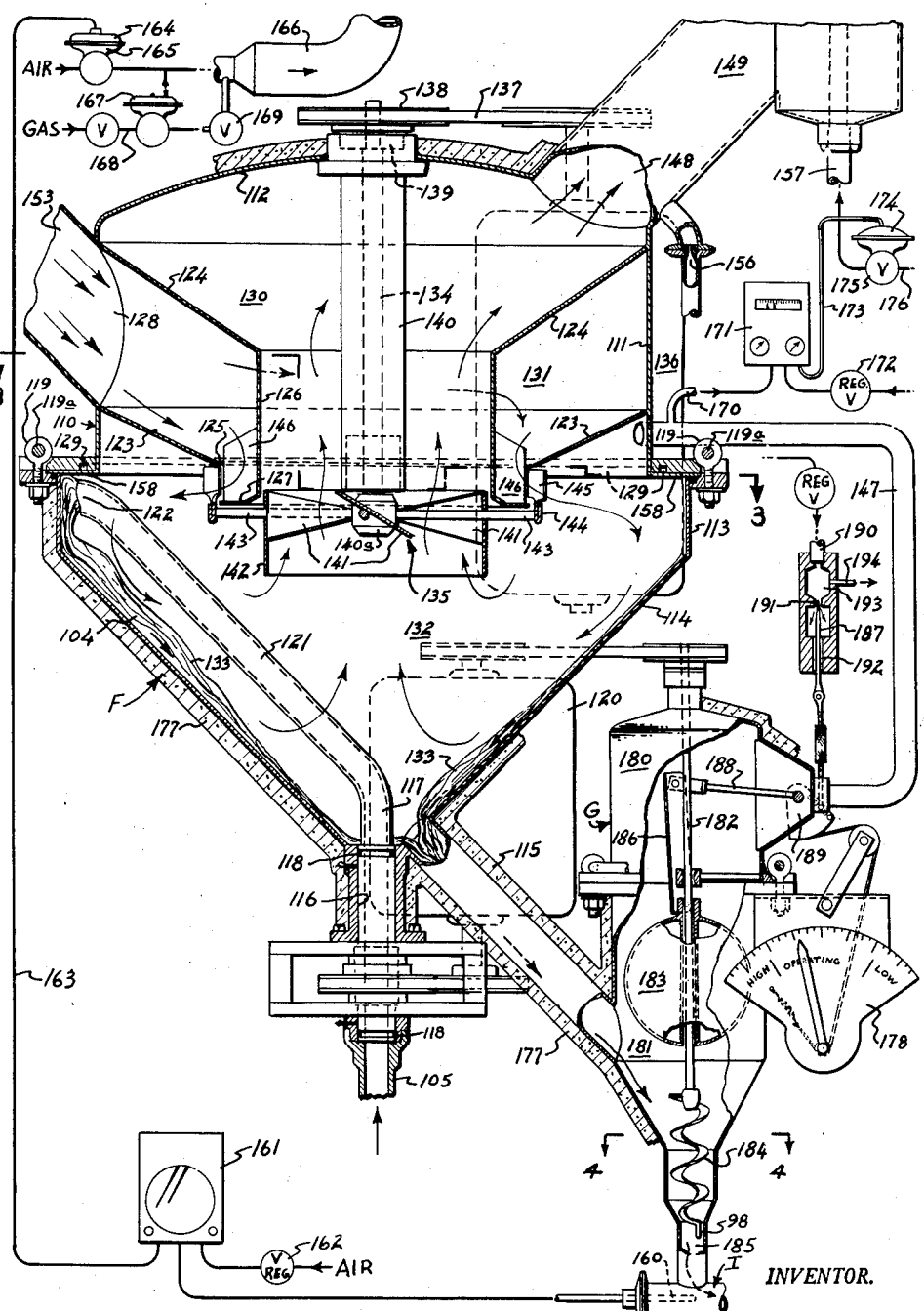
FIG. 2 is a view in elevation and in section, enlarged with respect to FIG. 1, of a food-heating sterilizer apparatus embodying the principles of this invention. Some of the piping and valves are shown diagrammatically, and some associated elements are shown, partly in elevation and partly broken away and in section.

So far as heating is concerned, the unit in FIGS. 6 and 7 acts in principle very much like that of FIGS. 2 and 3. Whirling steam heats the food at the interface without mixing the steam with the food product. However, with the steam at relatively low temperature (e.g., 350–360° F.) it will mostly condense on the surface of the product and heat it mostly by latent heat of condensation. It thus differs from the use of equilibrium or evaporative conditions that are possible with the heater of FIG. 2. However, though there is condensation and dilution, the condensation takes place on the surface of the product without previous intermixture or violent agitation.

OPERATION—PRESTERILIZATION OF THE SYSTEM

Before running a food product through the aseptic canning system, that system is first treated so that the pertinent parts thereof are in a sterile condition.

In doing this, no solids are added; i.e., the belt 62 is not operated. The valve 34 is closed to the pipe 33, and tap water is introduced into the system through the pipes 36 and 35, the float chamber 41, the conduit 45, the funnel 90, and the pump E, which sends it into the product heater F through the conduit 105 and the inlet tube 117.

With the steam superheater 150 operating, superheated steam, e.g., at 800–1200° F. and at a pressure of 45–50 p.s.i.g. is sent through the inlet 128 into the housing 110. There the impeller blades 145 and baffles 146 send it whirling out into the chamber 132. There it heats the tap water to about 290–300° F., and then the steam is recirculated by the fan blades 141 through the outlet conduit 148.

The heated water and the steam soon sterilize the interior of the heater housing 110. The hot water, under pressure, flows into the conduit 115 and thence into the float chamber 181, which is kept at the same pressure as the chamber 132 by the tube 147. Thus the conduit 115 and float chamber 181 are sterilized.

When the filler system and the conduits connecting the heater to the filler have been sterilized and proper operation of the filler assured, the valve 34 is turned to send the liquid product 31 from the kettle 30 into the system. The hoppers 60 are already filled with solids, and the screw 66 and belt 62 now carry the solids into the mixer D. At first, as the food pushes out the tap water ahead of it, there is some dilution, so the first few cans R are thrown away.

NORMAL OPERATION

In normal operation, a liquid food component 31, preheated in the kettle 30 to any desired temperature, flows by gravity through the pipe 33, the valve 34, and the pipe 35 into the housing 40. Thence it flows via the conduit 45 and funnel 90 to the pump E. The desired level is maintained by the float 42 and its action on the butterfly valve 54, which closes as the liquid level rises and opens as the liquid level drops.

Meanwhile, solids in the hopper 60 fall into the metering device 61, where they are fed uphill through a blanching solution or bath or steam.

Blanched solid components are metered by the screw whose speed and therefore measure is determined by the speed of the motor H and by the local transmission on each screw drive shaft. The measured solids fall through the outlet 68 onto the belt 62 and are carried to the chute 94, whence they fall into the funnel 90.

In the funnel 90, the slowly rotating hollow screw 97 mixes the liquid and solids together, and the tip 98 prevents them from bridging the pump inlet. The pump E, operated by the motor H, sends the mixture 104 through the pipe 105 to the rotating inlet tube 117 of the product heater F.

As the mixture 104 pours out from the rotating spout 122, it flows gently down the walls 113 and 114. The spout 122 is rotating at between 30 and 80 r.p.m. so that tender frangible solids are not damaged and so that the walls 113 and 114 are always covered with the food product 104. As it gently flows down the walls 113 and 114, the product 104 is heated by super-heated steam that is whirled circularly around in the chamber 132 by the fast-rotating impeller blades 145. The high-temperature superheated steam sweeps the surface of the product mixture without mixing with the product, and heat transfer occurs at the surface. The walls 113 and 114 are at all points cooler than the food product flowing down them; so there is no danger of the food burning on them. The cooling channel 129 is filled with circulating cool water, causing the steam to condense on the wall area 158 and keep the boundary between the steam and the product cool, thereby preventing burn-on at the surface of the wall 158.

The whirling of the superheated steam prevents intermixing of the steam with the product, prevents the food product from spattering on hot metal surfaces of the housing 110 or fan 135, and prevents any of the food product from being entrained with the steam being recirculated through the superheater 150.

The cooled steam, still dry, is expelled by the fan blades 141 into the upper chamber 130 and sent to the superheater 150 by the conduit 148, for reheating and recirculation. The conduit 147 connecting the chamber 132 to the housing 180 keeps the latter at the same pressure as the former.

The heated product 104 leaves the housing 110 substantially without dilution (unless dilution is desired) and may even be somewhat concentrated, if desired. Normally, however, it will leave with exactly the same water content as it had when it entered the heater F.

With the alternative heater 400, the heating process is similar, but the product is diluted by condensate. The steam is given its whirling action by the stationary jet nozzles 413, and the steam is not recirculated.

The heated product (at about 290° F. or within the 275° to 300° F. range) leaves the heater F through the conduit 115 and enters the float chamber 181. Its level here is dependent on the amount of product being dispensed by the filler K and the pumping rate of the pump E. The float 183 follows the product level, and when the float 183 rises or gets lower, it closes or opens the needle valve 187, varying the pneumatic pressure through the tube 194 to the pneumatic amplifier 195. The amplifier 195 controls the motor H to speed it up or slow it down. Variation of the speed of the motor H controls the speed of the pump E and of the metering screws for the solid components of the mixture 104. As the level in the chamber 181 rises, the pump E and screw slow down; when the level falls in the float chamber 181, they speed up. Also, by the effect of the pump speed on the liquid level in the float chamber 41, the valve 54 meters the liquid component. Thus, any change in the filling rate automatically controls the metering of the components into the heater F.

The effect of the metering rate on the heating action, as well as any other heating effect, causes actuation of the temperature controller 161, and countermeasures are instantly taken in the burner 151 to raise or lower the steam temperature to bring it back to the desired level. Thus, all the operations are slaves of the filler.

From the float chamber 181 the food product flows under the pressure exerted at the chamber 132 through the insulated tube 196 of the temperature-maintaining device I, where the high temperature is prolonged for the few seconds necessary to insure complete sterilization of the product 104.

The sterilized product 104 is then cooled to the desired level (to avoid undesirable chemical effects) and passes to the filler.

EXAMPLES OF THE HEATING PROCESS OF THIS INVENTION

In the following examples the various liquids or liquiform products are all heated by direct surface contact with recirculating heated steam, according to the foregoing description of my method and apparatus.

EXAMPLE 1

Seventy pounds of green split peas were added to 30 gallons of vigorously boiling water in a steam-jacketed kettle and the mixture thoroughly cooked until the peas were dispersed to form a puree or slurry. The volume was then made up to exactly 40 gallons by adding water.

The above slurry was poured by the distributing spout 122 gently down the sloping walls 113 and 114 of the heating chamber 132, while superheated steam was whirled at high velocity within the chamber 132 in contact with the surface of the gently flowing slurry. The steam swept the surface of the gently flowing slurry and gave up to the slurry some of its superheat or specific heat as well as some of its latent heat. Heat transfer was thus across the vapor-liquid interface, part of heat being from the specific heat of the steam and part from latent heat involving condensation. The cooled steam was recirculated through the gas-fired superheater 150 in which it was reheated and re-used in heating the slurry.

The slurry, thus heated almost instantaneously by surface contact with the superheated steam, flowed continuously from the heating chamber 132 through the insulated holding tube I and water-jacketed cooling tube J, and was discharged through a back-pressure pump to the slurry supply kettle 30. The flow of cooling water through the jacket 197 of the cooling tubes J was reduced sufficiently to maintain the temperature of the slurry discharged into the supply kettle 30 to approximately 150° F. to simulate actual processing conditions. The slurry was then recirculated through the closed system continuously for a period of 41 minutes during which the temperatures and flow rates were recorded.

At the end of the test the volume of slurry was carefully measured to determine the amount of steam added to the slurry by condensation during the circulation and recycling of the slurry in the heating operation. It was found to be 51.5 gallons, showing addition of 11.5 gallons of water.

The apparatus was then dismantled and examined for signs or evidence of burn-on on any of the metal parts. No scorching of the slurry nor burn-on was found in any parts of the apparatus, which was substantially that shown in FIG. 8.

The temperatures and flow rates recorded in the tests are presented in Table I.

*Table I.—Split-Pea Slurry*

| Time, in minutes | Liquid Product (Split-Pea Slurry) | | | | | | Steam | | |
|---|---|---|---|---|---|---|---|---|---|
| | Flow rate, gallons per minute | Initial temperature, °F. | Temperature attained in process, °F. | Holding time after heating, seconds | Holding temperature, °F. | Final temperature, °F. | Pressure, p.s.i.g. | Temperature on entering process chamber, °F. | Temperature on leaving process chamber |
| 10 | 5.6 | 165 | 285 | 45 | 279 | 162 | 59 | 950 | 530 |
| 16 | 5.2 | 158 | 280 | 46 | 280 | 158 | 53 | 940 | 550 |
| 21 | 4.5 | 160 | 278 | 53 | 278 | 149 | 66 | 960 | 560 |
| 25 | 4.2 | 158 | 282 | 57 | 281 | 143 | 66 | 990 | 560 |
| 29 | 5.4 | 155 | 280 | 44 | 281 | 144 | 60 | 930 | 560 |
| 33 | 5.6 | 153 | 278 | 45 | 278 | 135 | 59 | 890 | 555 |
| 37 | 4.1 | 152 | 292 | 59 | 290 | 128 | 66 | 920 | 555 |
| 41 | 4.5 | 146 | 289 | 46 | 288 | 124 | 65 | 920 | 555 |
| Average | 4.9 | 156 | 283 | 49 | 282 | 143 | 63 | 937 | 555 |

There was no burning of the liquid product in this or in the other examples.

As said above, the volume of the liquid product after 41 minutes, at the end of the test, was 51.5 gallons, representing in this instance, net condensation of 11.5 gallons of water from the heating steam. This corresponds to a gain rate of only 3.3% per cycle, which is very little condensation, or about 1.3 gallons per 40 gallon cycle. Even this amount can be eliminated by using hotter steam or more rapid circulation. Under these conditions, where the liquid product weighs approximately 8.5 pounds per gallon and has a specific heat of approximately 1.0, calculations from standard tables show that about 47½% of the heat transfer is by condensation and that about 52½% is transferred by convection.

EXAMPLE 2

To a slurry like that of Example 1, diced potatoes were added. It was then heated to about 150° F. in a kettle. Then it was heated by the method of this invention by superheated steam at about 900° F. to a process temperature of above 295° F., held, and cooled as before. No burning was noted and the amount condensed was again practically negligible.

EXAMPLE 3

The slurry of Example 1 was supplemented by diced potatoes and carrots. At a flow rate of 4.9 gallons per minute, the product was heated according to the invention from about 143° F. to about 280° F. The steam was at a pressure of about 61.5 p.s.i.g., and dropped from about 950° F. to about 550° F. Upon cooling, there had been no burning nor significant condensation of the steam into the product.

EXAMPLE 4

A product substantially the same as that of Example 3 was heated from about 149° F. to about 290° F. under 80 p.s.i.g. steam pressure at about the same temperature as in Example 3. The product was cooled to about 106° F. There was no significant increase in product volume (i.e., no significant condensation of the steam into the product) and no burning of the heated product.

EXAMPLE 5

A product like that of Examples 3 and 4 was heated at a flow rate of about 4.8 gallons per minute from about 156° F. to about 288° F. by steam at a pressure of 82 p.s.i.g. and at an initial temperature of about 880° F., cooling the steam to about 555° F. as it left the heating chamber 132. Again there was no burning and little, if any, condensation.

EXAMPLE 6

Similar satisfactory results were obtained by heating a product similar to that of Examples 3, 4, and 5 at a flow rate of about 4.6 gallons per minute from about 184° F. to about 288° F. by steam at 81 p.s.i.g. and about 952° F., cooling the steam thereby to about 580° F.

EXAMPLE 7

Cream of potato soup containing ⅜" diced potatoes was similarly treated by steam. The soup, preheated to about 163° F., flowed at a rate of about 4.6 gallons per minute in the novel heat exchanger, where by direct contact (but not mixture) with steam at 645° F., it was heated to about 292° F., cooling the steam to 430° F.

EXAMPLE 8

Cream of chicken soup was processed in a similar manner by preheating it to 174° F., and then flowing it through the heater at 4.7 gallons per minute and contacting it with steam at about 620° F. It was held for 64 seconds at its new temperature of about 286° F. The steam was recirculated through a gas fired superheater, being carried away as its temperature dropped to about 410° F. Again, cooking was done without burning and without significant condensation.

EXAMPLE 9

Ground beef was used to make a hamburger ("beefburger") soup of very thick consistency. The cooking was done in the manner described, by heating the soup from about 185° F. to about 290° F. and holding it at about 290° F. for about one minute. The steam entered at about 660° F. (35 p.s.i.g.) and was withdrawn at about 440° F. and recirculated through a superheater. The results were quite satisfactory.

EXAMPLE 10

Very thick minestrone was heated at a flow rate of 5 gallons per minute from about 146° F. to about 295° F. and held there for about one minute. The steam entered at about 600° F. and left at about 425° F., under about 87 p.s.i.g. Again, there was satisfactory cooking without burning or accumulation of unwanted water.

EXAMPLE 11

Minestrone was canned at the rate of 42 16-oz. cans per minute after being heated from about 147° F. to about 295° F. by steam that entered at 600° F. and left at 420° F. at 86 p.s.i.g. The minestrone was held for about 45 seconds at about 295° F. to get heat penetration into the solid particles; and then the soup was cooled to a satisfactory canning temperature of about 120° F.

EXAMPLE 12

Minestrone soup was canned at the same rate as that of Example 11, being steam heated according to this invention from about 160° F. to about 285° F., held there for 43 seconds, and cooled to about 115° F. The steam was at 83 p.s.i.g. and was cooled in the heater F from about 670° F. to about 430° F.

EXAMPLE 13

A pea soup slurry like that of Example 1 was partially condensed or concentrated, by raising the steam entry temperature to about 1200° F. and by increasing the circulation rate to a value sufficient to transfer all the heat by convection and to evaporate into the steam about 10% of the value of the liquid. This flow rate was easily calculated from standard tables.

EXAMPLE 14

Several hundred canned samples were packed in each of the tests outlined in Examples 7, 8, 9, 11, and 12, and 96 cans from each lot were incubated at 98–100° F. to check sterility. Samples were also submitted to the National Canners Association Laboratory in Berkeley, California for bacteriological studies. No spoilage occurred in either my own incubation tests or in the N.C.A. studies.

From the foregoing it is clear that the invention comprises an evaporator as well as a heater, and that the volume of liquid in the product may be increased, reduced, or left the same merely by adjustment of the temperature, pressure, and flow rate of the steam relative to the flow rate and initial temperature of the product.

Although steam, usually superheated, has been used throughout as an example and is usually preferred in food processing, other hot gases may be used, such as hot nitrogen or hot helium, and (when oxidation is no problem) hot air. The general term "hot gas" is used in some of the claims to indicate this broad application of the invention.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A product heater, including in combination a closed housing having a product inlet, a product outlet near the bottom of said housing, a generally conical wall above said product outlet, a steam inlet, and a steam outlet, both said steam inlet and said steam outlet being above said product outlet; a revolving spout in said housing closely adjacent said wall and closer thereto than said steam inlet and said steam outlet, so that said steam does not pass through between said spout and said wall, and connected to said product inlet for pouring said product onto the upper end of said wall to form a gently moving stream at all times covering said wall and insulating it from steam, means for sending rapidly whirling superheated steam coming from said steam inlet against the surface only of said product stream, and means for cooling the upper end of said wall opposite said spout at the upper extremity of said moving stream and consequently the boundary on said wall between the stream and the steam, so that burn-on there of the product is prevented.

2. A heater for an aseptic canning system, including in combination a housing having a cylindrical upper portion with a closed upper end and a conical funnel-like lower portion with an outlet tube leading from the lower end to one side thereof and a central axial opening; a rotating product inlet tube in said axial opening having a portion extending upwardly into said housing generally parallel to said conical portion and having an outlet spout adjacent the upper end of said conical portion; steam superheating means; a steam inlet conduit connecting said steam superheating means to said housing; impelling means in said housing to impel the steam in a rapidly whirling vortex toward the sides of said lower housing portion; and means to exhaust cooled steam from the center of said vortex.

3. The heater of claim 2 having means for recirculating most of the steam from said exhaust means to said superheating means and thence back into said steam inlet conduit.

4. The heater of claim 2 wherein said impelling means comprises a central manifold in said housing to which said steam inlet conduit leads, a series of tubes extending radially out from said manifold toward said housing, and a series of nozzles directed perpendicularly to the tubes at the ends of said tubes and on the same generally horizontal plane.

5. The heater of claim 2 wherein said impelling means and said exhaust means include a rotating fan in said housing having peripheral impeller blades in the path of the inlet steam to whirl it outwardly, and central blades for pulling cooled steam from below and sending it upwardly into said upper portion, and a conduit leading from said upper portion to said superheating means.

6. The heater of claim 5 wherein said fan has driving means outside said housing.

7. A heater for an aseptic canning system, including in combination a housing having a cylindrical upper portion with a closed upper end and a conical funnel-like lower portion with an outlet tube leading from the lower end to one side thereof and a central axial opening; a rotating product inlet tube in said axial opening having a portion extending upwardly into said housing generally parallel to said conical portion and having an outlet spout adjacent the upper end of said conical portion; steam superheating means; a steam inlet conduit connecting said steam superheating means to said cylindrical upper portion; an annular partition extending inwardly and dividing said upper portion from said lower portion; an inner generally cylindrical partition in said upper portion having an outlet from its upper end; an axially extending rotary shaft mounted centrally in said upper portion and extending down below said partitions; a series of inner fan blades supported on said rotary shaft and rotated thereby to impel steam from below said partitions up into said inner partition; a peripheral impeller on said shaft surrounding said fan blades, having impeller blades; and a series of stationary baffles projecting in a radially outward direction from said inner housing inclined opposite to the impeller blades.

8. A heater for an aseptic canning system, including in combination a housing having a cylindrical upper portion with a closed upper end and a conical funnel-like lower portion with an outlet tube leading from the lower end to one side thereof and a central axial opening; a rotating product distributing inlet tube in said axial opening having a portion extending upwardly into said housing generally parallel to said conical portion and having an outlet spout adjacent the upper end of said lower portion; means for impelling superheated steam toward said lower housing portion in a whirling stream; cooling channel means on the outside of said housing closely adjacent the boundary between said product and said steam to condense a portion of the steam on said housing at said boundary and prevent said product from meeting walls hotter than the product; and means to exhaust steam from the central area of said lower portion.

9. A product heater for an aseptic canning system, including in combination a housing having walls defining a cylindrical upper portion with a closed upper end and a sloping lower portion with outlet means leading from the lower end of said lower portion; product distributing and inlet means in said housing for distributing the product along the upper end of said lower portion; means for impelling rapidly moving superheated steam toward said lower housing portion; and cooling channel means for said housing walls opposite said outlet means and therefore closely adjacent the boundary along the housing wall where said product and said steam meet, thereby causing some of said steam to condense so as to prevent said product from impinging on dry walls hotter than the product.

10. A product heater for a canning system, including in combination a housing having a generally cylindrical upper portion with a closed upper end and a conical funnel-like lower portion with an outlet tube leading from the lower end to one side thereof and a central axial opening; a rotating product inlet tube in said axial opening having a portion extending upwardly into said housing and having an outlet spout adjacent the upper end of said conical portion; steam superheating means; a steam inlet conduit connecting said steam superheating means to said cylindrical upper portion; annular partition means extending inwardly from said housing and dividing the interior of said housing into an upper chamber, an intermediate steam-entry-and-distributing chamber, and a lower chamber including said lower portion of said housing, said upper and lower chambers being connected by a generally axial passage; and blower means for impelling steam through said intermediate chamber into said lower chamber in a whirling motion and thence into said generally axial passage; and means connecting said upper chamber with said steam superheating means, for reheating and recirculating the steam.

11. The product heater of claim 10 having means providing a constant bleed of steam from said housing to the atmosphere and means providing make-up steam in amount sufficient to maintain a predetermined pressure in said product heater.

12. The product heater of claim 11 having means for sensing the temperature of said product that has passed out said product outlet and means controlled by said sensing means for varying the heat imparted to said steam by said superheating means.

13. The product heater of claim 12 having a gas burner for said superheater having air and gas inlets and wherein the heat-varying means of claim 12 acts to increase the quantity of air and gas fed to said burner when the product temperature drops, while maintaining a constant air-gas ratio.

14. A product heater for an aseptic canning system, including in combination a housing having a cylindrical upper portion with a closed upper end and a conical funnel-like lower portion with an outlet tube leading from the lower end; a rotating product inlet spout for pouring out said product adjacent the upper end of said conical portion; steam superheating means; a central manifold in said housing connected to said steam superheating means; a series of tubes extending radially out from said manifold toward said housing; a series of nozzles directed perpendicularly to the tubes at the ends of said tubes and on the same generally horizontal plane, to impel the steam in a rapidly whirling vortex toward the sides of said lower housing portion; and means to exhaust to the atmosphere cooled steam from the center of said vortex.

15. A product heater, including a supporting surface; means having an outlet closely adjacent said supporting surface for gently distributing thereon a flowing product to be heated in a thin gently moving stream; means for continuously contacting the surface only of said stream with superheated steam, said last-named means including means for guiding said steam so that it is confined against passing through said product as said product passes from said outlet on to said supporting surface and for causing said steam to impinge against said liquid surface and to tend to force said liquid against said supporting surface; and means for keeping said supporting surface at all places cooler than the product in contact with it.

16. The heater of claim 15 having a cool-liquid-carrying channel on the opposite side of said supporting surface from said product and near the boundary between said product and said steam.

17. A heat exchanger, comprising a housing having a generally vertically extending wall that is generally circular in horizontal cross section and that has an interior surface, means for distributing a liquid as a film all around said interior surface, means for introducing and withdrawing heated gas into said housing exclusively at loci nearer to the center of said housing than where said distributing means distributes said liquid on said housing wall and for whirling said heated gas in said housing to impinge against said liquid on the opposite surface of the liquid from that in contact with said housing wall, whereby said liquid is heated by convection and said gas does not pass through said liquid, and means for keeping said housing wall at all places cooler than said heated liquid in contact with said wall.

References Cited in the file of this patent

UNITED STATES PATENTS

| | | |
|---|---|---|
| 1,705,822 | Lindsey | Mar. 19, 1929 |
| 2,041,059 | French | May 19, 1936 |
| 2,703,139 | Rappleyea | Mar. 1, 1955 |
| 2,708,167 | Nanz | May 10, 1955 |
| 2,731,081 | Mayner | Jan. 17, 1956 |
| 2,779,724 | Dunning et al. | Jan. 29, 1957 |
| 2,904,109 | Malm | Sept. 15, 1959 |

FOREIGN PATENTS

| | | |
|---|---|---|
| 178,556 | Germany | Nov. 15, 1906 |
| 458,963 | Great Britain | Dec. 30, 1936 |